(12) United States Patent
Weissinger (10) Patent No.: US 6,256,544 B1
(45) Date of Patent: *Jul. 3, 2001

(54) APPARATUS AND METHOD FOR CONTROLLING FUNCTIONAL UNITS IN A MANUFACTURING INSTALLATION

(75) Inventor: Wolfgang Weissinger, Freiberg (DE)

(73) Assignee: Duerr Systems GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/910,243

(22) Filed: Aug. 13, 1997

(30) Foreign Application Priority Data

Aug. 13, 1996 (DE) .............................. 196 32 609

(51) Int. Cl.[7] .................................. G05B 15/00

(52) U.S. Cl. .............................. 700/1; 700/96

(58) Field of Search ............. 700/96, 110, 112, 700/113, 1, 2, 4

(56) References Cited

U.S. PATENT DOCUMENTS

| 4,459,146 |   | 7/1984 | Farkas et al. ........................ 65/29.11 |
| 4,646,245 | * | 2/1987 | Prodel et al. ...................... 364/468.2 |
| 4,672,530 | * | 6/1987 | Schuss ................................... 700/4 |
| 5,519,603 | * | 5/1996 | Allbery et al. ........................... 700/4 |

FOREIGN PATENT DOCUMENTS

| 35 54 465 A1 | 4/1987 | (DE) . |
| 37 01 554 | 8/1988 | (DE) . |
| 42 25 834 A1 | 2/1994 | (DE) . |
| 0 376 738 | 7/1990 | (EP) . |

OTHER PUBLICATIONS

Hufnagel, P., "Intelligente Weichenstellung," Messen, prüfen, automatisieren (mpa), No. 4, Apr. 1996, pp., 36, 38, 40.

"Steuern im Verbund," Messen, prüfen, automatisieren (mpa), No. 5, May 1996, pp. 22, 23.

Leonhard Sturm, et al., "Ein Konzept für die optimale Verteilung von Steuerungsaufgaben im Feldbereich—A Strategy for Optimal Program Allocation to Control Units at the Field Level," *Automatisierungstechnische Praxis—ATP,* Bd. 34, Nr. 11, Nov. 1, 1992, pp. 629–636.

W. Lawrenz, "'Autobusse' für die Sensor/Actor–Vernetzung am BeispieLCAN—'Autobuses' for Sensors/Actuator Communication Based on CAN–Protocol," *Automatisierungstechnische Praxis—ATP,* Bd. 35, Nr. 8, Aug. 1, 1993, pp. 450–460.

Webb et al., "Programmable Logic Controller—Principles and Apllications"Prentice Hall, 36–37 and 39–40, 1995.*

W. Christopher Lamp, et al., "Criteria for Sensor/Actuator Bus Selection," *Advances in Instrumentation and Control,* Bd. 49, Nr. Part 01, Jan. 1, 1994, pp. 127–136.

* cited by examiner

Primary Examiner—William Grant
Assistant Examiner—Chad Rapp
(74) Attorney, Agent, or Firm—Barry R. Lipsitz (57) ABSTRACT

To improve a manufacturing installation comprising a plurality of functional units carrying out at least one function and cooperating in the manufacturing installation, each of the functional units comprising at least one actor and at least one sensor for function control and/or function monitoring, such that it is less susceptible, it is proposed that the functional unit comprise at least one intelligent control unit which operates independently of a central computer and in accordance with a function control program of its own stored in a program memory, with the control unit controlling the at least one actor and/or evaluating signals of the at least one sensor in accordance with the function control program.

53 Claims, 8 Drawing Sheets

APPARATUS AND METHOD FOR CONTROLLING FUNCTIONAL UNITS IN A MANUFACTURING INSTALLATION

The invention relates to a manufacturing installation which comprises a plurality of functional units carrying out at least one function and cooperating in the manufacturing installation, each of the functional units comprising at least one actor (e.g., actuator) and at least one sensor for function control and/or function monitoring.

To date, the so-called "central intelligence" concept has been used in such manufacturing installations. According to this concept, each functional unit has associated with it a unit which either detects signals of a sensor and passes them via a so-called field bus system to the central system controls or detects signals from the central computer and controls the actor in accordance with these.

This concept makes it necessary for a large amount of data to be exchanged via the field bus system, which, in itself, causes considerable susceptibility.

The object underlying the invention is, therefore, to so improve a manufacturing installation of the generic kind that it is less susceptible.

This object is accomplished in accordance with the invention in a manufacturing installation of the kind described at the outset in that the functional unit comprises at least one intelligent control unit which operates independently of a central computer and in accordance with a function control program of its own stored in a program memory, with the control unit controlling the at least one actor and evaluating signals of the at least one sensor in accordance with the function control program.

The advantage of the inventive solution is to be seen in the fact that each function step no longer has to be processed via the field bus in the central computer. Instead, the control unit makes it possible to process the function steps of the functional unit independently. The communication requirement and hence also the susceptibility involved therein are thereby considerably reduced.

With the inventive concept it does, in principle, remain possible, in the case of special functions, for example, involving considerable computing time, to revert to a central computer via a bus system. However, this has the disadvantage that the program structure acquires considerable complexity.

With a view to achieving a program structure which is as uninvolved as possible, it is, therefore, particularly advantageous for each control unit to independently carry out all the provided functions with the function control program, i.e., for it itself to carry out all computing operations required for the functions so that each control unit is self-sufficient in this respect.

The advantage of this solution is also to be seen in the fact that the susceptibility to failure is considerably reduced owing to the provided functions being able to be carried out independently of the functionability of the communication of the control unit with other units.

In the extreme case, the inventive concept could be realized in such a way that the function control program operates without information from the other control units of the other functional units. However, such isolated operation is not realizable in complex manufacturing installations.

It is, therefore, necessary to make provision for communication between the individual functional units. This is realized in accordance with the invention by the control unit of a functional unit communicating directly with the control unit of at least one other of the functional units. This means that by direct communication of the respective control unit with the control unit of at least one other of the functional units an exchange of information is possible. Therefore, in spite of the independent operating mode in each control unit, information from other functional units can be taken into account, and, consequently, it is possible to carry out the same complex control procedures with a decentral control system, as in the case of the "central intelligence" concept known from the prior art.

In the inventive solution, provision is, for example, made for each control unit to detect all function parameters necessary for the functions of the functional unit and to control the functional unit in accordance with these. This means that the control unit detects only function parameters as input values and hence is capable of independently deriving all control functions. This solution has the great advantage that each control unit requires only the function parameters as input values in order to be able to carry out the function control in its full scope.

For this reason, provision is made for the control unit to include at least part of the function parameters by evaluation of the signals of the at least one sensor. In the simplest case of an inventive manufacturing installation, it could also be sufficient to determine all function parameters by evaluation of the signals of the sensors associated with this control unit.

As stated above, in complex installations it is, however, necessary to obtain information and hence function parameters from other control units. Therefore, in this case, in accordance with the invention, the control unit detects part of the function parameters by communication with at least one of the other control units of the manufacturing installation.

In the case of communication provided between the individual control units it is particularly advantageous for all control units of the manufacturing installation to be connected to a bus system and to, therefore, be able to communicate with one another via the bus system.

Such a bus system can, for example, be a LON bus, an INTERBUS or a PROFIBUS.

For reasons of simplicity of the communication and flexibility of the structure of the inventive manufacturing installation, provision is preferably made for each control unit to be capable of receiving and transmitting communication signals via the bus system so that even when, in principle, no communication is necessary, it is possible to change this, if required, i.e., to set up communication with other control units.

In principle, it is sufficient to design the control units such that the function control program can be implemented in these, for example, by use of a corresponding program memory or by a corresponding programming connection.

If each control unit communicates via a bus system anyhow, it is particularly advantageous for each control unit to be programmable via the bus system as the bus system offers a particularly simple and advantageous possibility of reaching each control unit and hence programming each control unit via a programming station connected to the bus system, for example, by a function control program compiled by the programming station being loaded by the programming station via the bus system into the respective control unit.

Provision is also made in an advantageous variant of the inventive concept for the operating mode of each control unit to be checkable via the bus system so that it is possible to detect failures in both the hardware and the software via the bus system.

The easiest way of realizing this is for each control unit to deliver error messages via the bus system, for example, when a program error or hardware error occurs while the function control program is running.

In the above description of the inventive manufacturing installation it was not specified how the control unit is locally arranged.

It is, for example, possible to combine all control units—as is the case so far—in a switch cabinet which is locally arranged completely separate from the manufacturing installation.

It is, however, particularly advantageous for the control unit to be locally associated with each functional unit so as to eliminate the necessity for a large number of lines to lead from the switch cabinet to the individual functional units in order to connect their actors and sensors to the switch cabinet.

Even more advantageous is an embodiment wherein the at least one actor and the at least one sensor of each control unit are directly connected to the functional unit so it is possible to manufacture the functional unit together with the control unit and to also directly wire the two to one another during the manufacture.

After construction of the manufacturing installation it then only remains necessary for the control unit to be connected to the respective leads.

In a particularly advantageous solution, each control unit is arranged directly on the respective functional unit, i.e., connected to the frame or support thereof, and so the control unit can be directly assembled and wired during the manufacture of the functional unit.

If the control unit is locally associated with the functional unit, provision is advantageously made for the bus system to be led to each control unit locally associated with the respective functional unit.

Provision is also preferably made for a power supply network to be led to each control unit locally associated with the functional unit.

In the above description of the individual components of the manufacturing installation, no further details were given of the design of the control unit itself.

In a particularly advantageous embodiment, each control unit comprises an intelligent processor module operating independently of the central computer and in accordance with a function control program, a power module controlling the at least one actor, and a sensor module operating the at least one sensor and receiving its signals.

This module design of the inventive control unit has the great advantage that, on the one hand, it is very maintenance-friendly, and, on the other hand, it makes it possible to provide several power modules and hence control several actors and to also provide several sensor modules so as to be able to use several sensors.

To establish a connection between the bus system and the processor module, provision is preferably made for the processor module to comprise a transmitter and receiver unit which establishes a connection between a processor unit of the processor module and the bus system.

In particular, in the case of a control unit which is locally associated with the functional unit, in order to make information directly available to maintenance personnel, provision is made for each control unit to comprise a display module operating a function display.

With this display module it is, for example, possible to display all kinds of operating states. It is, however, particularly advantageous for this display module to be used for indicating an error via the function display.

Especially during emergency operation, in order to be able to gain direct access to the respective control unit and to operate it during emergency operation, provision is preferably made for each control unit to comprise an input/output module operating an input unit. It is then possible, for example, to use a manually actuatable terminal to keep the control unit capable of functioning.

Particularly in all the cases in which the respective control unit communicates with other control units, in order to detect function parameters necessary for its own function control program via these control units, it is particularly advantageous for communication signals produced by other control units during normal operation for the respective control unit, for example, communication signals containing function parameters, to be generatable with the input unit. This makes it possible to operate the corresponding functional unit with the inventive control unit in spite of, for example, failure of the bus system.

As an alternative or supplement to this, provision is also made for a fault operating mode of the control unit in which the power module thereof is directly controllable to be activatable via the input unit, i.e., in this case there is no more controlling via the function control program, but direct controlling of the power module via the input unit.

Such controlling of a power module directly via the input unit is purposeful when it is recognizable which signals or parameters are detected by the sensors.

For this reason, a particularly advantageous solution makes provision for the function parameters detected by the sensor to be displayable by the input unit.

In the above description of the inventive manufacturing installation, it was not stated in detail how the manufacturing installation is divided up into the individual functional units.

In a particularly advantageous embodiment each functional unit forms its own function section of the manufacturing installation and so the functional units are conceived in accordance with the individual part functions of the manufacturing installation.

The inventive manufacturing installation is preferably constructed such that it comprises an input unit and an output unit for the articles to be processed and such that the articles pass through the functional units arranged between the input unit and the output unit.

Also each functional unit can be expediently designed so as to comprise an inlet for taking over the articles and an outlet for delivering the articles. In this case, the passing of the articles through the respective functional unit can be particularly easily detected with sensors.

In an especially expedient functional design of the inventive manufacturing installation, each functional unit arranged between the input unit and the output unit takes over the article from the preceding functional unit and after completion of its own function delivers it to the following functional unit.

The object stated at the outset is also accomplished in a method of operating a manufacturing installation comprising a plurality of functional units carrying out at least one function and cooperating in the manufacturing installation, each of the functional units comprising at least one actor and at least one sensor for function control and/or function monitoring, in accordance with the invention, in that each functional unit is operated by a control unit independently of a central computer in accordance with a function control program of its own, with the actor being controlled and signals of the sensor being evaluated.

The advantage of the inventive solution is also to be seen in the fact that the necessity for communication is thereby considerably reduced and hence the susceptibility of such a manufacturing installation is also considerably reduced.

It is particularly expedient for all of the provided functions to be independently controlled by each control unit.

In a highly expedient inventive method, the respective control unit communicates directly with the control unit of at least one other of the functional units in the event that it is necessary to be able to obtain and process information on functions of the other control units, as is required, in particular, for operating complex manufacturing installations.

In a particularly expedient variant of the inventive method, all function parameters necessary for the functioning of the functional unit are detected by each control unit, and the functional unit is controlled in accordance with these. Therefore, each control unit only has to detect function parameters, and the control unit itself is able to carry out all other computing operations required for the controlling of the functions.

The function parameters are at least partly detected by evaluating the signals of the at least one sensor of the control unit and so no communication is required for this.

As mentioned above, in complex manufacturing installations, it is, however, necessary to obtain information, in particular, function parameters, from other control units. For this reason, provision is made for part of the function parameters to be detected by the control unit by direct communication with at least one other of the control units of the manufacturing installation.

Communication between the control units is preferably carried out by information from all control units being delivered to a bus system or received by a bus system.

Particularly easy access to the individual control units is possible when each control unit can be programmed via the bus system and so the bus system can be advantageously used not only to transmit communications but also to transmit program information for the individual control units.

The bus system can also be used with advantage when the operating mode of each control unit can be checked via the bus system.

The simplest way of realizing this is for error messages to be delivered by each control unit via the bus system.

Further features and advantages of the invention are the subject matter of the following description and the drawings of several embodiments.

Figure 1:
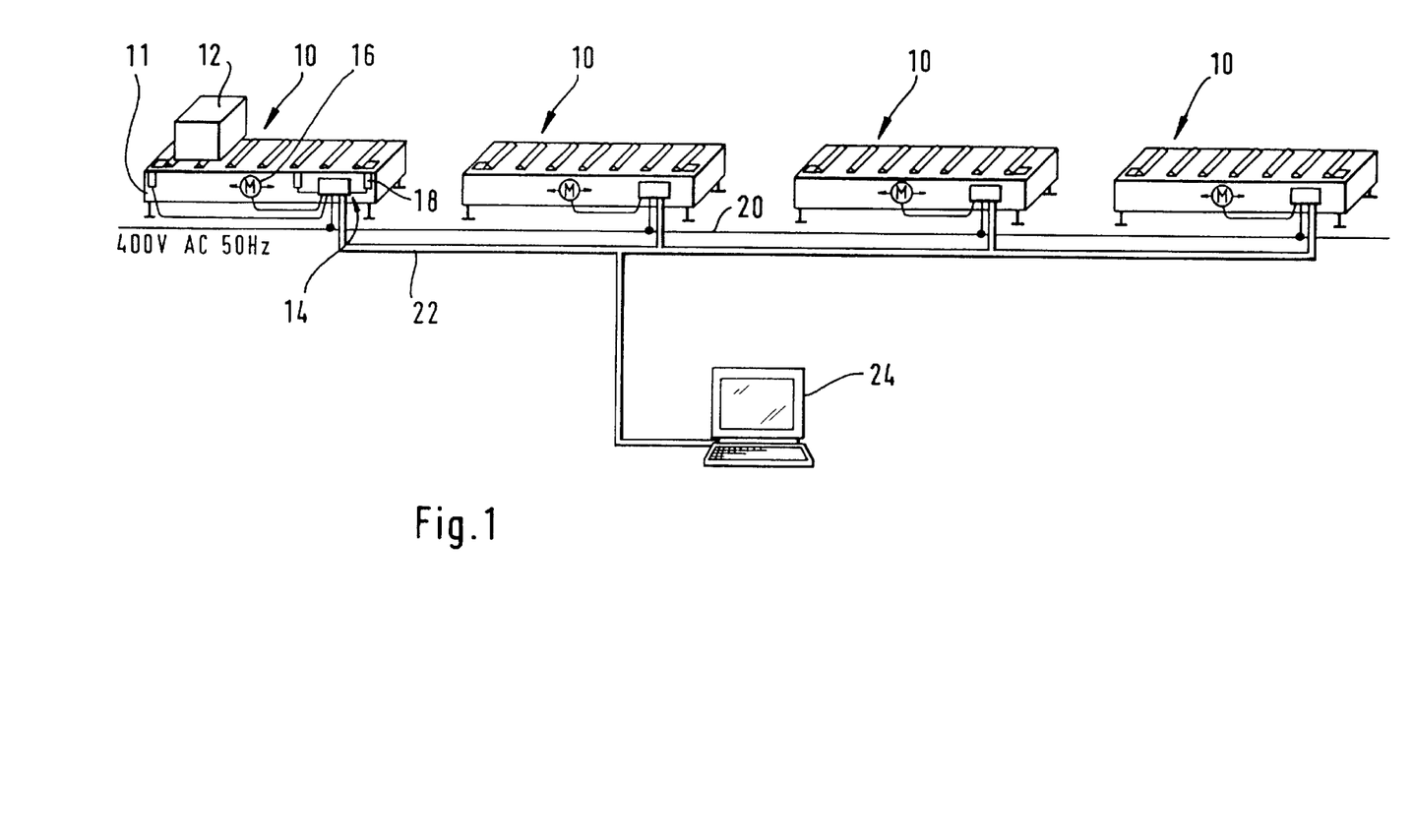
FIG. 1 a schematic partial representation of a first embodiment of an inventive manufacturing installation.

An embodiment of an inventive manufacturing installation, illustrated, by way of example, in FIG. 1, comprises a plurality of functional units 10, in this case, roller conveyor units, which are constructed as independent modules which are arranged, for example, one after the other and cooperate with one another in the manufacturing installation, in this case, in order to, convey, for example, a transportable article 12 such as, for example, a workpiece, in accordance with the manufacturing sequence.

At each of these functional units 10, a control unit 14 is arranged directly on a frame 11 thereof. The control unit 14 serves to control an actor (e.g., actuator) M serving as actor 16 which, in this case, drives the rollers. The actor 16 is controlled via signals from sensors 18 which, for example, determine as function parameters the position of the article 12 along the manufacturing installation so the article 12 can be transported along the individual functional units 10 in accordance with the actual position of the article 12 and the position of the article 12 as required by the manufacturing sequence.

Each of the control units 14 is directly connected to a power supply network 20 which provides the electric power for operating the actors 16.

Each functional unit 10 is also connected to a bus system 22 which permits communication between the individual control units 14.

Also connected to the bus system 22 is a central station 24 whose function will be explained in detail hereinbelow.

Figure 2:
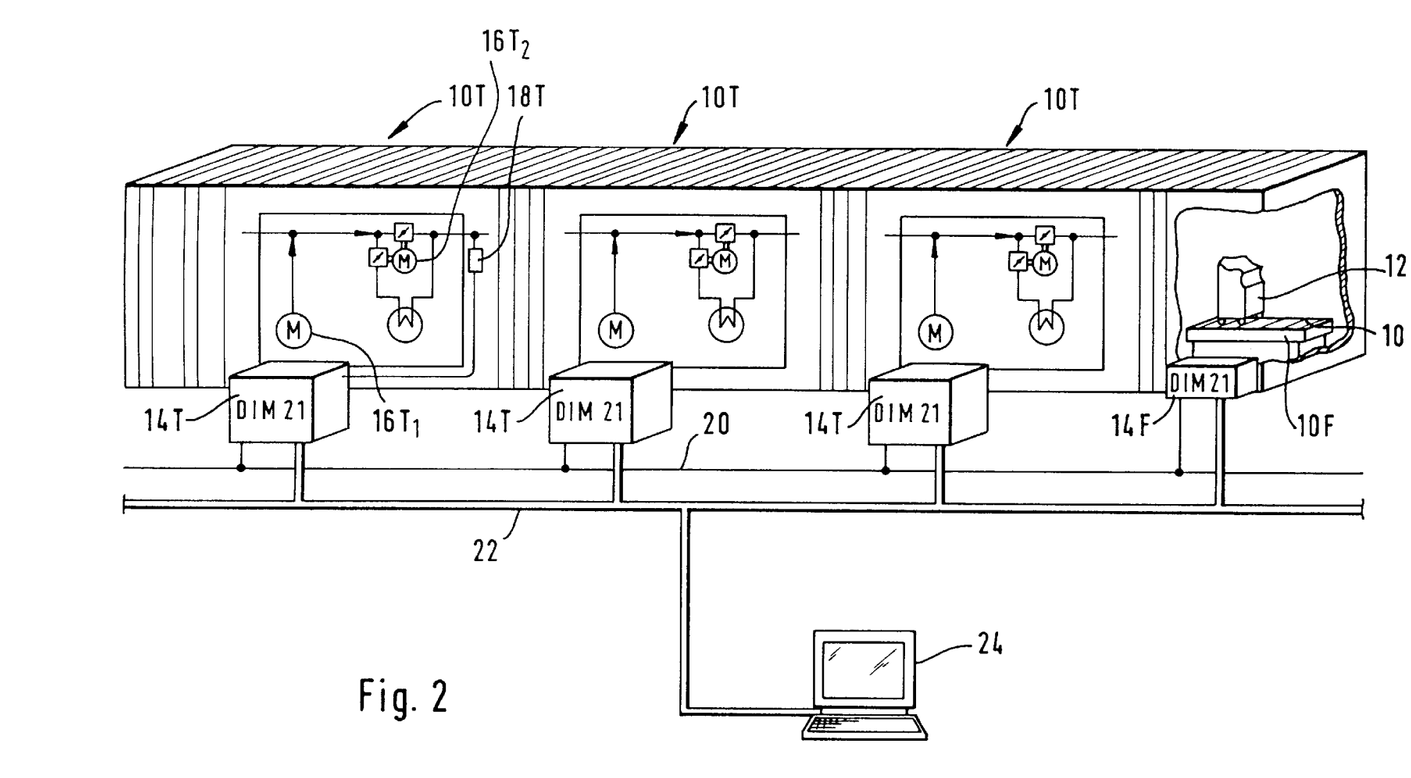
FIG. 2 a schematic representation similar to FIG. 1 of a second embodiment of an inventive manufacturing installation.

In a second embodiment of an inventive manufacturing installation, illustrated in FIG. 2, the individual functional units 10 are not identical to one another, but represent different functional units of the manufacturing installation. For example, the manufacturing installation comprises drier units 10T, each of which is provided with an inventive control unit 14T which, in this case, controls as first actor $16T_1$ a fan motor and as second actor $16T_2$ a drive motor for air flaps, more particularly, on the basis of the signal of a detecting sensor 18T which detects the temperature as function parameter.

In order to transport the workpiece 12 through the individual drier units 10T, there is additionally associated with each drier unit 10T a conveyor unit 10F as functional unit which is likewise controllable via a control unit 14F locally associated therewith, more specifically, for example, in the same way as described, in principle, in conjunction, with the first embodiment according to FIG. 1.

Accordingly, in the second embodiment both a drier unit 10T and a conveyor unit 10F are arranged alongside one another as independent functional units 10 in each section of the manufacturing installation. Each is equipped with an inventive control unit 14T and 14F, respectively, and all communicate with one another via the same bus system 22 and are supplied via the same power supply network 20.

Figure 3:
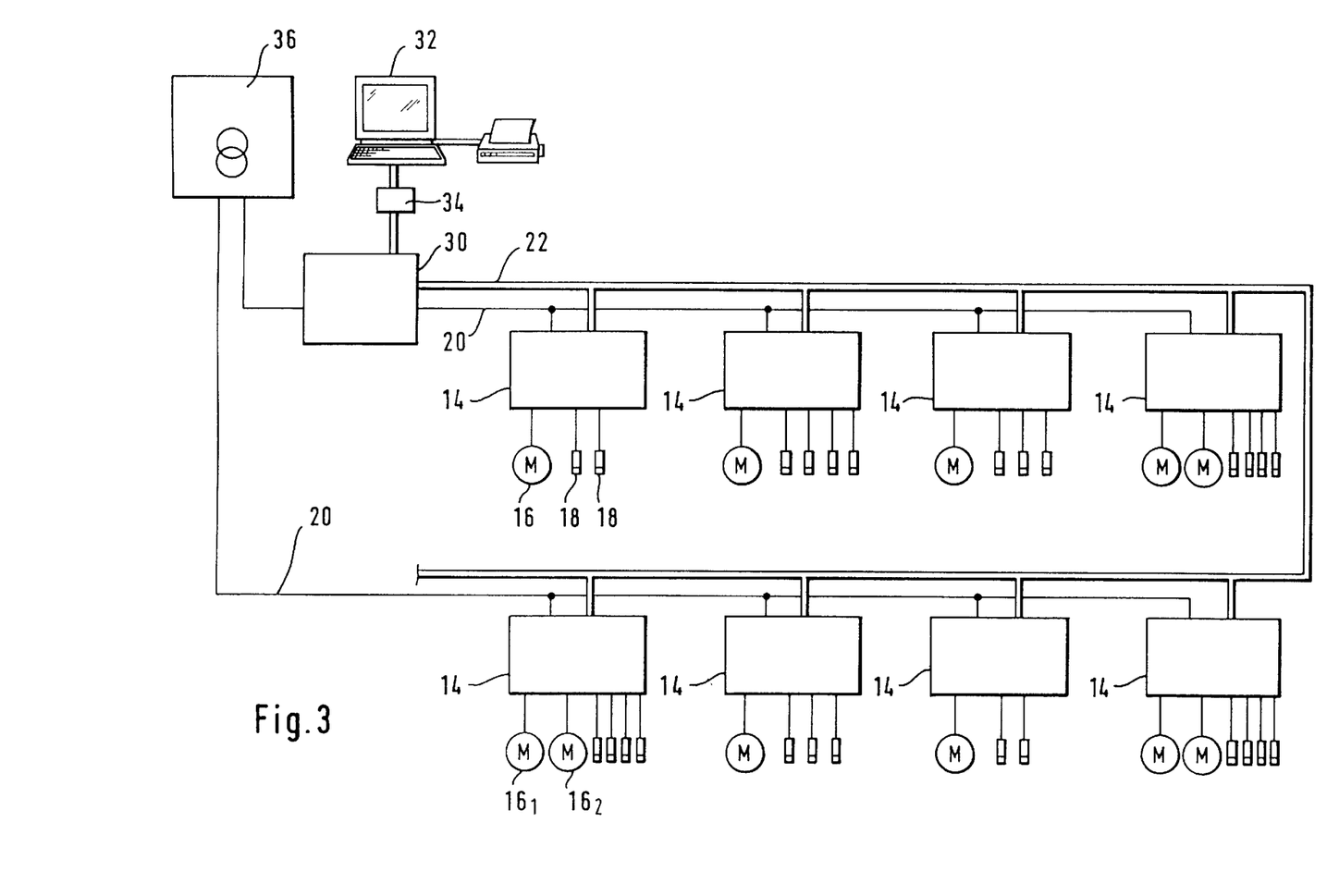
FIG. 3 a schematic representation of the inter-connection between the control units including the necessary supply means in an inventive decentral control system.

The inventive concept of connecting all independent control units 14, for example, via an LON bus system 22 is clearly illustrated in FIG. 3.

The LON bus system 22 has, for example, a man-machine interface 30 which communicates via the LON bus system 22 with the individual control units 14.

An external access to the LON bus system 22 is also possible, for example, via an external computer 32 by means of an adapter 34, and communication with the individual control units 14 is possible, for example, via this external computer 32.

As described above, one or several actors 16 and one or several sensors 18 for controlling the corresponding functional unit 10 are associated with each of these control units 14.

Each control unit is also connected to the power supply network 20 which, in turn, is supplied by a central supply station 36.

Figure 4:
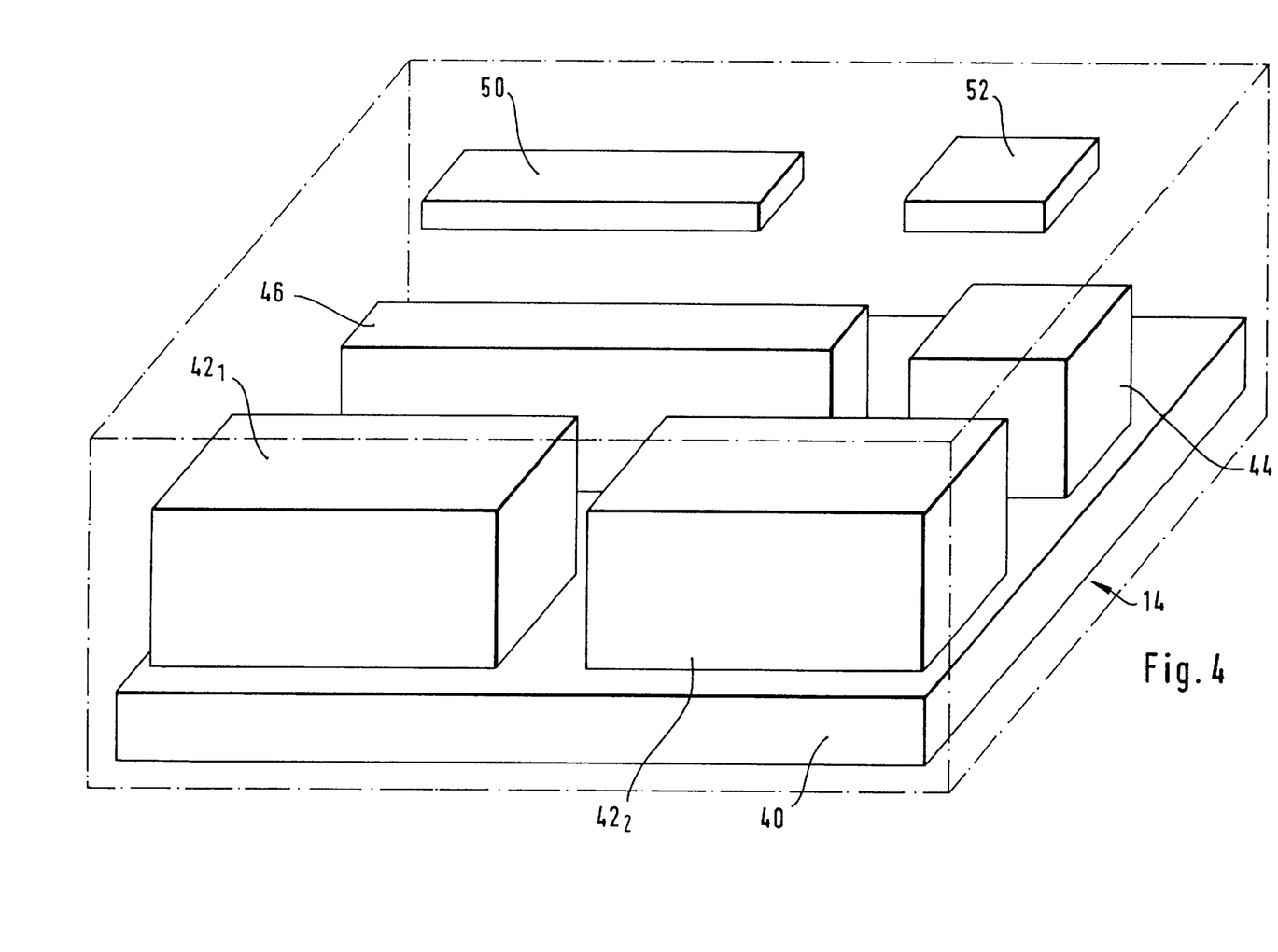
FIG. 4 a schematic representation of individual modules of an inventive control unit.

As illustrated in FIG. 4, each of the control units 14 is of modular design. The base module of each control unit is a basic module 40 to which a variable number of power modules $42_1$ and $42_2$ is connected.

A processor module 44 and a variable number of sensor modules 46, in accordance with the number of sensors, are also connected to the basic module 40.

The functioning and operating mode of the control unit 14 are indicated via a display module 50, and a bus-external access to the control unit 14 is possible via an input unit 52, for example, a manual terminal.

Figure 5:
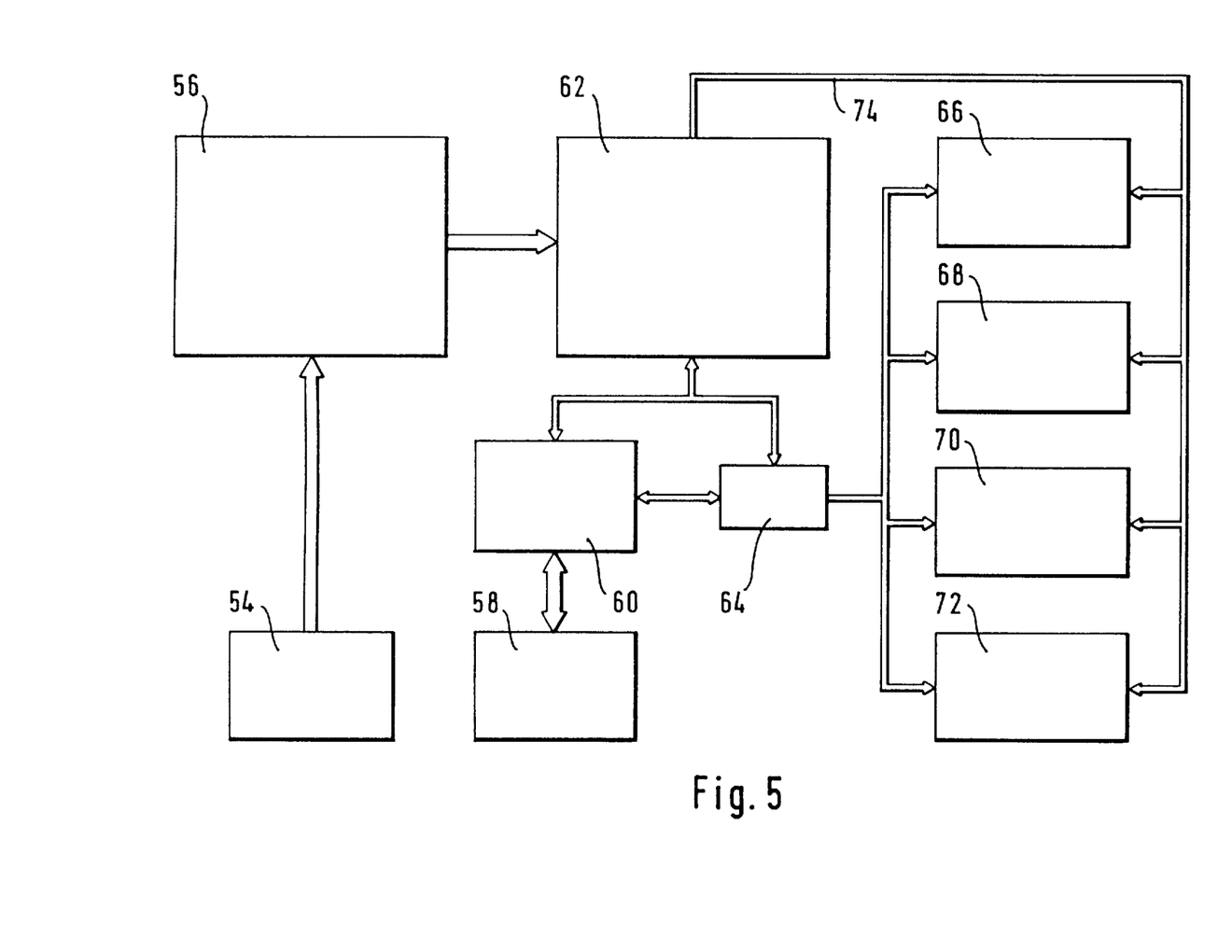
FIG. 5 a schematic representation of the most important components of the base module.

As illustrated in FIG. 5, the basic module 40 has a connection 54 for the power supply network 20 and the connection 54 is connected to a voltage processing unit 56.

The basic module 40 also has a connection 58 for the bus system 22 and the connection 58 is connected to a connection 60 for the processor module 44.

The processor module 44 is also connected to a low-voltage supply means 62 which is supplied by the voltage processing unit 56.

The low-voltage supply means 62 also supplies, for example, a bus controller 64 of an internal bus system 74 of the control unit 14, a connection 66 of the sensor module 46, a connection 68 of the display module 50, a connection 70 of the input unit 52 and connections 72 for the power modules 42.

The connection 60 of the processor module 44, the connection 66 of the input/output module 48, the connection 68 of the display module 50, the connection 70 for the input unit 52 and the connections 72 for the power modules 42 are also connected to the processor module 44, for example, via the internal bus system 74, which enables internal communication of the individual modules of the respective control unit 14.

Figure 6:
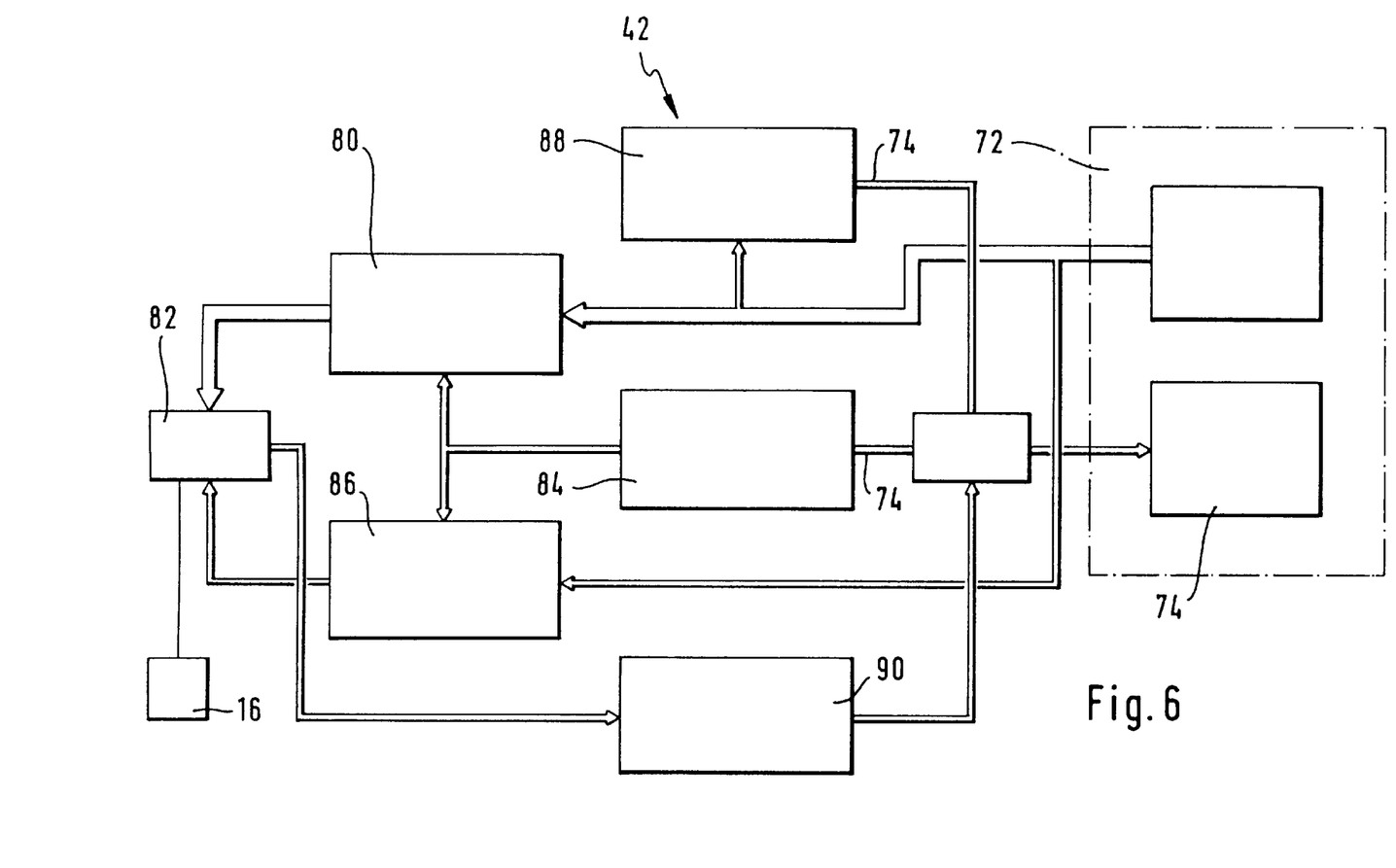
FIG. 6 a schematic representation of the most important components of the power module.

Each of the power modules 42, in turn, comprises, as illustrated in FIG. 6, a power electronics 80 which is directly connected to the connection 72 and is thereby also supplied with the corresponding electric power.

The power electronics 80 is, in turn, connected to a connection 82 for the actor 16, for example, a motor M, and the actor 16 is supplied with the necessary power via this connection 82.

The power electronics 80 is controlled via a control circuit 84 which is connected, for example, by means of the internal bus system 74, to the processor module 44, and the connection with the internal bus system 74 is also made via the connection 72. The control circuit 84 not only controls the power electronics 80 but also a supply means 86 for a brake relay associated with the actor 16, and this brake relay is controlled via the motor connection 82.

Each power module 42 additionally includes a phase monitoring means 88 for monitoring the electric power supplied to the power electronics 80. The phase monitoring means 88 is also connected to the processor module 44, for example, by means of the internal bus system 74, and transmits phase information via the internal bus system 74 to, for example, the control circuit 84.

Also connected to the motor connection 82 is a motor temperature monitoring means 90 which via the processor module 44, for example, via the internal bus system 74, likewise exchanges information on the motor temperature with the control circuit 84.

Figure 7:
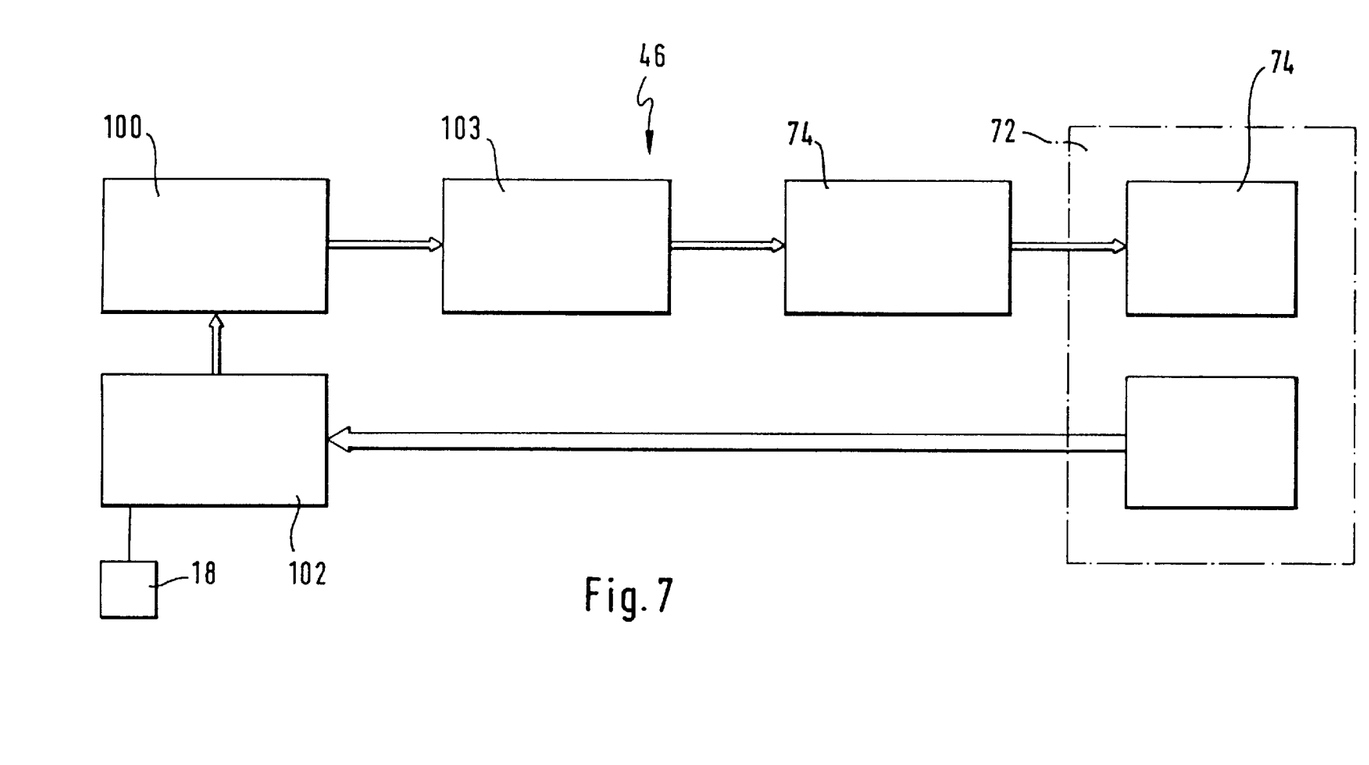
FIG. 7 a schematic representation of the most important components of the sensor module.

Each sensor module 46 comprises, as illustrated in FIG. 7, starting from the connection 72 provided therefor on the basic module 40, a signal processing unit 100 which is connected via a sensor connection 102 to the respective sensor 18 and processes its signals accordingly. The signal processing unit 100 passes these signals via a dc decoupling means 103 on to the internal bus system 74 which is likewise connected via the connection 76 to the control unit 46.

The sensor connection 102 is directly supplied via the connection 72 with low voltage made available by the basic module 40.

Figure 8:
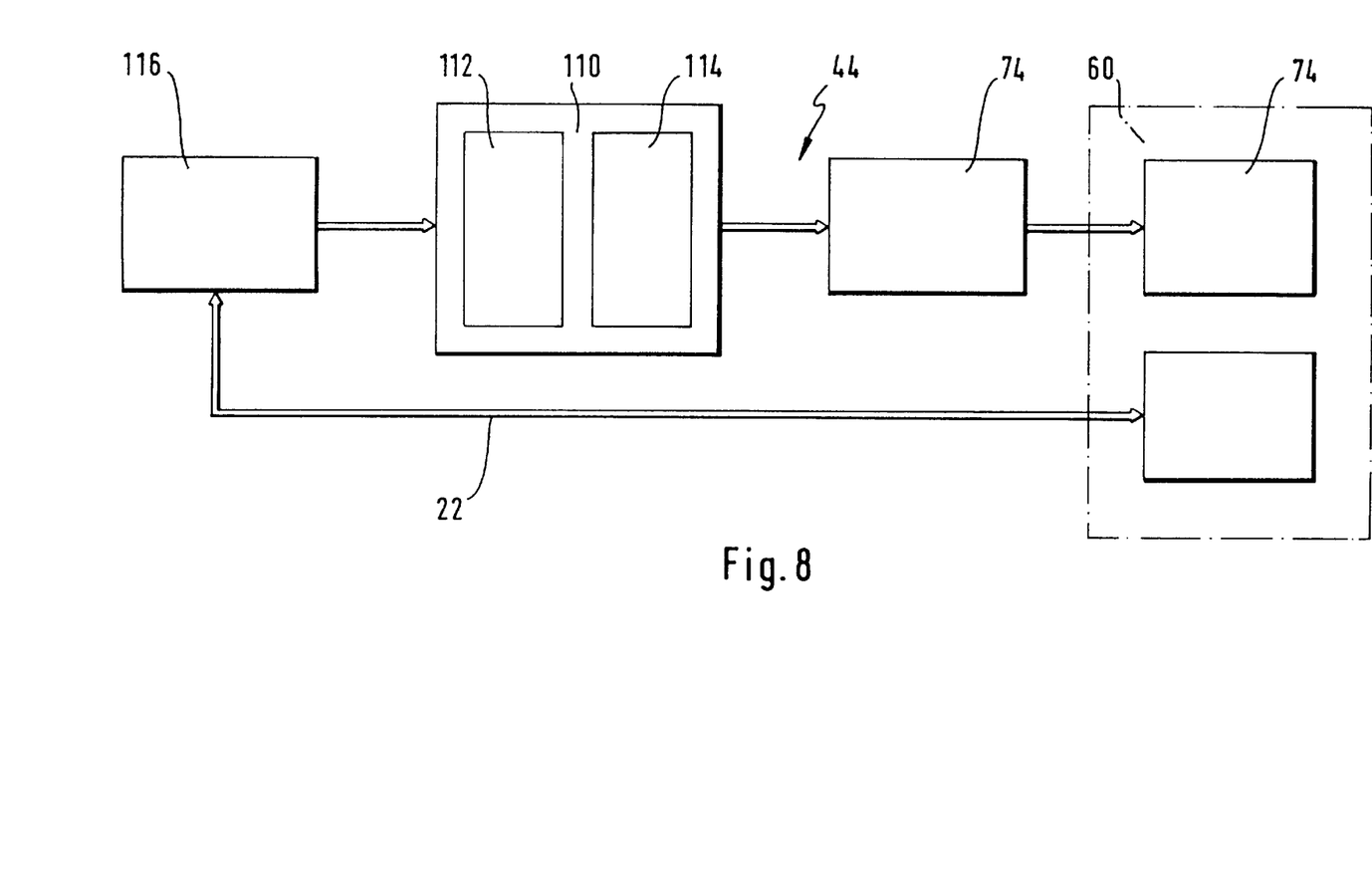
FIG. 8 a schematic representation of the most important components of the processor module.

As illustrated in FIG. 8, the processor module 44 comprises a connection made via the connection 60 with the other modules, for example, via the internal bus system 74, with a processor unit 110 comprising, for example, a LON processor which includes not only a computer 112 but also a sufficiently large control-program memory 114.

The processor unit 110 communicates with a transmitter/receiver unit 116 for the bus system 22, the transmitter/receiver unit 116 being connected via the connection 60 to the bus system 22, and so the communication with the bus system 22 takes place via the transmitter/receiver unit 116.

The program memory 114 contains a function control program which permits all functions of the functional unit 10 to be controlled.

What is claimed is:

1. A self-contained functional unit for a manufacturing system in which a plurality of such funcational units cooperate in a decentralized manner to process an article according to a manufacturing sequence, said functional unit comprising:

at least one actuator and at least one sensor for controlling and/or monitoring a function to be performed; and at least one intelligent control unit (ICU) having a function control program to operate the functional unit independently of any central computer, said ICU also having a dedicated power module, a dedicated sensor module, and a dedicated basic module which together control at least one actuator and/or evaluate signals of the at least one sensor of the functional unit; wherein:

the basic module receives power from a power supply network external to the functional unit;

the power module receives power from said basic module;

the ICU controls said at least one actuator by applying power thereto from said power module;

there sensor module receives low voltage from said basic module; and the ICU (i) powers the at least one sensor by applying said low voltage thereto from the sensor module, and (ii) evaluates signals of the at least one sensor by receiving said signals via the at least one sensor module.

2. A functional unit in accordance with claim 1 comprising at least one of:

a plurality of actuators controlled by said ICU; and a plurality of sensors powered and evaluated by said ICU.

3. A functional unit in accordance with claim 1 containing a plurality of intelligent control units, each ICU carry out associated functions in accordance with its function control program independently of the other ICUs.

4. A functional unit in accordance with claim 1 wherein said ICU detects all function parameters necessary for operation of the functional unit, and controls the functional unit in accordance therewith.

5. A manufacturing installation having a plurality of functional units in accordance with claim 1, comprising a common data bus for connecting the intelligent control units of the functional units.

6. A functional unit in accordance with claim 5 wherein each of said intelligent control units is programmable via said data bus.

7. A functional unit in accordance with claim 5 wherein a mode of operation of each of said intelligent control units is adapted to be checked via said data bus.

8. A functional unit in accordance with claim 5 wherein each of said intelligent control units delivers error messages via said data bus.

9. A functional unit in accordance with claim 1 wherein said at least one actuator and at least one sensor are directly wired to the functional unit.

10. A functional unit in accordance with claim 1 wherein said at least one ICU comprises:

a processor unit; and a transmitter and receiver unit coupled to establish communication between the associated processor unit and a data bus.

11. A functional unit in accordance with claim 1 wherein said at least one ICU comprises a display module for providing a function display.

12. A functional unit in accordance with claim 1 wherein:

said at least one ICU comprises an input/output module and an associated input unit; and the input/output module operates said input unit.

13. A functional unit in accordance with claim 12 wherein:

said input unit is adapted to generate, during emergency operation of said manufacturing installation, substitute communication signals for the respective ICU to replace signals which are, during normal operation of said manufacturing installation, produced by other intelligent control units.

14. A functional unit in accordance with claim 12 wherein the input unit is adapted to activate a fault operating mode of the associated ICU for directly controlling the associated power module.

15. A functional unit in accordance with claim 12 wherein function parameters detected by an associated sensor are displayable by each input unit.

16. A manufacturing installation comprising a plurality of functional units in accordance with claim 1, wherein:

each functional unit forms its own function section of said manufacturing installation.

17. A functional unit in accordance with claim 1 further comprising:

an inlet for accepting said article from a previous functional unit, and an outlet for delivering said article after processing to a following functional unit.

18. A method for operating a manufacturing installation, comprising:

(a) providing a plurality of functional units each carrying out at least one function and cooperating in said manufacturing installation to process an article according to a manufacturing sequence, wherein each of said functional units comprises at least one actuator and at least one sensor for function control and/or function monitoring;

(b) providing, for each functional unit, at least one respective intelligent control unit (ICU) having a function control program to operate the ICU independently of any central computer;

(c) providing, for each ICU, a dedicated power module, a dedicated sensor module, and a dedicated basic module which together control at least one actuator and/or evaluate signals of at least one sensor of the associated functional unit;

(d) providing power to the basic module of each ICU from a power supply network external to the functional unit;

(e) providing power from the basic module of each ICU to the power module of that ICU;

(f) each ICU controlling the associated at least one actuator by applying power thereto from the power module of the ICU;

(g) providing low voltage from the basic module of each ICU to the sensor module of that ICU;

(h) each ICU powering the associated at least one sensor by applying said low voltage thereto from the sensor module of that ICU; and (i) each ICU evaluating signals from the associated at least one sensor by receiving said signals via the sensor module of that ICU.

19. The method of claim 18 comprising:

independently controlling all of the functions provided in each ICU.

20. The method of claim 18 comprising:

detecting, at each ICU, all of the function parameters necessary for the functioning of the associated functional unit; and controlling the associated functional unit in accordance with the function parameters thereof.

21. The method of claim 20 comprising:

detecting, at each ICU, part of the function parameters by direct communication with at least one other ICU.

22. The method of claim 18 wherein information for a plurality of intelligent control units is delivered to, or received from, a common data bus.

23. The method of claim 22 wherein each ICU is programmable via the data bus.

24. The method of claim 22 wherein a mode of operation of each ICU is adapted to be checked via the data bus.

25. The method of claim 24 wherein error messages are delivered from each ICU via the data bus.

26. The method of claim 18 comprising:

taking over an article from a previous functional unit at an inlet of at least one of the functional units; and delivering the article, after processing, to a following functional unit at an outlet of said at least one of the functional units.

27. A decentralized control system for controlling a plurality of functional units that each carry out at least one respective function and cooperate in a manufacturing installation to process an article according to a manufacturing sequence, each of said functional units comprising at least one actuator and at least one sensor for controlling and/or monitoring a function to be performed, said control system comprising:

at least one intelligent control unit (ICU) for each functional unit, said ICU having a function control program to operate the associated functional unit independently of any central computer, said ICU also having a dedicated power module, a dedicated sensor module, and a dedicated basic module which together control the at least one actuator and/or evaluate signals of the at least one sensor of the associated functional unit; wherein:

the basic module receives power from a power supply network external to the functional unit;

the power module receives power from said basic module;

the ICU controls the actuator of the associated functional unit by applying power thereto from said power module;

the sensor module receives low voltage from said basic module; and the ICU (i) powers the sensor of the associated functional unit by applying said low voltage thereto from the sensor module, and (ii) evaluates signals of the sensor of the associated functional unit by receiving said signals via the sensor module.

28. A control system in accordance with claim 27, wherein each ICU carries out all of its functions independently of the other independent control units using its associated function control program.

29. A control system in accordance with claim 27, wherein each ICU detects all function parameters necessary for the functioning of its associated functional unit and controls the associated functional unit accordingly.

30. A control system in accordance with claim 27 comprising:

a common data bus for connecting all of the intelligent control units of the manufacturing installation.

31. A control system in accordance with claim 30 wherein each of the intelligent control units is coupled to receive and transmit communication signals via said data bus.

32. A control system in accordance with claim 30 wherein each ICU is programmable via said data bus.

33. A control system in accordance with claim 30 wherein a mode of operation of each ICU is adapted to be checked via said data bus.

34. A control system in accordance with claim 30 wherein each ICU delivers error messages via said data bus.

35. A control system in accordance with claim 27, wherein the at least one actuator and at least one sensor of each ICU are directly wired to the associated functional unit.

36. A control system in accordance with claim 27, comprising a common data bus for coupling a plurality of intelligent control units.

37. A control system in accordance with claim 27, wherein each ICU comprises:

a processor unit; and a transmitter and receiver unit adapted to establish communication between the associated processor unit and a data bus.

38. A control system in accordance with claim 27, wherein each ICU comprises a display module operating a function display.

39. A control system in accordance with claim 27, wherein:

each ICU comprises an input/output module and an associated input unit; and the input/output module operates the associated input unit.

40. A control system in accordance with claim 39, wherein:

each input unit is adapted to generate, during emergency operation of the manufacturing installation, substitute communication signals for the respective ICU, to replace signals which are, during normal operation of the manufacturing installation, produced by other intelligent control units.

41. A control system in accordance with claim 39, wherein each input unit is adapted to activate a fault operating mode of the associated ICU for directly controlling the associated power module.

42. A control system in accordance with claim 39, wherein function parameters detected by an associated sensor are displayable by each input unit.

43. A control system in accordance with claim 27, wherein each functional unit forms its own functional section of the manufacturing installation.

44. A control system in accordance with claim 27, wherein at least one of the functional units comprises:

an inlet for taking over the article from a previous functional unit; and an outlet for delivering the article to a following functional unit after processing.

45. A method for controlling, in a decentralized manner, a plurality of functional units that carry out at least one respective function and cooperate in a manufacturing installation to process an article according to a manufacturing sequence, each of said functional units comprising at least one actuator, and at least one sensor for function control and/or function monitoring, said method comprising:

(b) providing, for each functional unit, at least one respective intelligent control unit (ICU) having a function control program to operate the ICU independently of any central computer;

(c) providing, for each ICU, a dedicated power module, a dedicated sensor module, and a dedicated basic module which together control the at least one actuator and/or evaluate signals of the at least one sensor of the associated functional unit;

(d) providing power to the basic module of each ICU from a power supply network external to the functional unit;

(e) providing power from the basic module of each ICU to the power module of that ICU;

(f) each ICU controlling at least one associated actuator by applying power thereto from the power module of the ICU;

(g) providing low voltage from the basic module of each ICU to the sensor module of that ICU;

(h) each ICU powering at least one associated sensor by applying said low voltage thereto from the sensor module of that ICU; and (i) each ICU evaluating signals from at least one associated sensor by receiving said signals via the sensor module of that ICU.

46. A method in accordance with claim 45, comprising:

independently controlling all of the functions provided in each ICU.

47. A method in accordance with claim 45, comprising:

detecting, at each ICU, all of the function parameters necessary for the functioning of the associated functional unit; and controlling the associated functional unit in accordance with the function parameters thereof.

48. A method in accordance with claim 47, comprising:

detecting, at each ICU, part of the function parameters by direct communication with at least one other ICU.

49. A method in accordance with claim 45, wherein information for all of the intelligent control units is delivered to, or received from, a data bus.

50. A method in accordance with claim 49, wherein each ICU is programmable via said data bus.

51. A method in accordance with claim 49, wherein a mode of operation of each control unit is adapted to be checked via said data bus.

52. A method in accordance with claim 51, wherein error messages are delivered from each ICU via said data bus.

53. A method in accordance with claim 45, wherein at least one of the functional units comprises:

an inlet for taking over the article from a previous functional unit; and an outlet for delivering the article to a following functional unit after processing.

* * * * *